UNITED STATES PATENT OFFICE 2,345,573

PROCESS FOR PREPARING β-NORBORNEOL AND ITS ETHER

Herman A. Bruson, Philadelphia, Pa., assignor to The Resinous Products & Chemical Company, Philadelphia, Pa., a corporation of Delaware No Drawing. Application November 18, 1942, Serial No. 466,049

4 Claims. (Cl. 260—611)

This invention relates to a method for the preparation of β-norborneol and di-norbornyl ether.

β-Norborneol was first described by Komppa and Beckmann (Liebig's Annalen der Chemie, 512, 172 (1934)) who obtained it from β-norbornylamine by diazotization and hydrolysis.

An object of this invention is to provide an inexpensive method by which this heretofore rare alcohol may be obtained from readily available hydrocarbons. Another object is to provide di-norbornyl ether, which is a new compound, as a by-product.

According to this invention, β-norborneol and di-norbornyl ether are obtained by reacting upon the addition product of ethylene and cyclopentadiene with sulfuric acid, and either subsequently or simultaneously heating the product with water. As is known, cyclopentadiene reacts with ethylene to form norbornylene (J. Am. Chem. Soc., Joshel and But, 63, 3351 (1941)).

It has been found advantageous to employ sulfuric acid containing from about 20% to 95% $H_2SO_4$ for this purpose. Good results are obtained by the use of aqueous 25% to 50% sulfuric acid, whereby approximately equal quantities of β-norborneol and di-norbornyl ether are obtained. The use of more concentrated sulfuric acid forms varying amounts of sulfonated materials which, upon treatment with hot water, also yield β-norborneol and di-norbornyl ether together with polymerized substances. In this process there does not appear to be any formation of the stereoisomeric α-norborneol.

In practicing this invention, the mixture of ethylene-cyclopentadiene adduct and sulfuric acid is stirred. If the sulfuric acid used contains from 50% to 80% water, the mixture is preferably heated between about 85° and 105° C. for several hours to complete the reaction. If the sulfuric acid employed is more concentrated, it is advantageous to cool the reaction mixture at first and subsequently to dilute with water and steam-distil the product. In either case a molar ratio of sulfuric acid and the hydrocarbon is advantageously employed. It is to be understood, however, that the proportions can be varied without departing from the spirit of the invention.

The following examples illustrate this invention, the parts being by weight:

Example 1

A mixture consisting of 1480 parts of aqueous 25% sulfuric acid and 350 parts of ethylene-cyclopentadiene adduct (boiling point 95°–100° C., obtained by heating cyclopentadiene with excess ethylene at 190°–200° C. in an autoclave for six hours) is rapidly stirred and boiled under reflux. After the reaction mixture has been boiled for five hours, it is allowed to stratify into two layers and the sulfuric acid layer is drawn off. The hot oil layer is then neutralized with powdered lime or sodium carbonate and filtered. The clear neutral filtrate is then distilled.

After a forerun of unreacted hydrocarbon, β-norborneol distils over between 175° and 190° C. at atmospheric pressure and solidifies to a colorless crystalline mass. The yield is about 125 parts. Upon crystallization from nitromethane, it melts at 126° C. It possesses the formula:

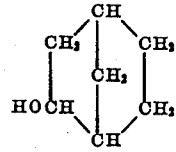

Its phenylurethane melts at 147° C.

A higher boiling fraction corresponding to di-norbornyl ether then distils over at 240°–270° C. and rapidly solidifies to a colorless crystalline mass. The yield is about 100 parts. After recrystallization from nitromethane, it melts at 67°–68° C. and possesses the formula:

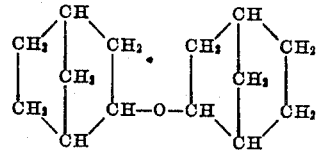

Example 2

Concentrated 95% sulfuric acid (200 parts) is mixed with 94 parts of ethylene-cyclopentadiene adduct while the reaction mixture is cooled to 5°–10° C. The mixture is stirred for three hours at this temperature, then for six hours at room temperature. The product is poured into 800 parts of water and distilled with steam. The β-norborneol distils over with the steam and is condensed and purified by distillation. The residual oil, upon distillation in vacuum, yields di-norbornyl ether.

The above compounds are useful for the manufacture of insecticidal materials and for other purposes.

I claim:

1. A method for preparing β-norborneol and di-norbornyl ether which comprises reacting water with ethylene-cyclopentadiene adduct in the presence of sulfuric acid.

2. A method for preparing β-norborneol and di-norbornyl ether which comprises reacting aqueous sulfuric acid containing between about 20% and 50% $H_2SO_4$ with ethylene-cyclopentadiene adduct.

3. A method for preparing β-norborneol and di-norbornyl ether which comprises reacting ethylene-cyclopentadiene adduct with sulfuric acid, adding water, and heating to approximately 100° C.

4. As a new compound, di-norbornyl ether having the formula:

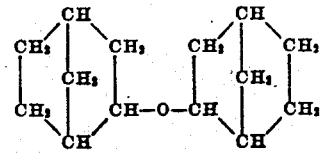

HERMAN A. BRUSON.